May 18, 1937. W. PATERSON 2,080,872
METHOD OF AND APPARATUS FOR ADDING REAGENTS TO LIQUIDS
Filed Jan. 19, 1934 2 Sheets-Sheet 1

W. Paterson
INVENTOR

By Marks & Clerk
Attys.

May 18, 1937.   W. PATERSON   2,080,872
METHOD OF AND APPARATUS FOR ADDING REAGENTS TO LIQUIDS
Filed Jan. 19, 1934   2 Sheets-Sheet 2

W. Paterson
INVENTOR

By Marks & Clerk
ATTYS

Patented May 18, 1937

2,080,872

UNITED STATES PATENT OFFICE 2,080,872

METHOD OF AND APPARATUS FOR ADDING REAGENTS TO LIQUIDS

William Paterson, London, England

Application January 19, 1934, Serial No. 707,405
In Great Britain January 30, 1933

6 Claims. (Cl. 210—22)

This invention relates to methods of and apparatus for proportionately adding a solid liquid or a gas to a liquid stream with particular reference to arrangements for effecting a proportionate injection of a reagent under pressure.

The object of the present invention is to devise improved methods of and apparatus for this purpose which will obviate any undue loading of the metering device for measuring the flow in proportion to which the addition is to be effected, and the invention includes a method of adding, proportional amounts of a solid liquid or a gas to a liquid which comprises "bleeding" through a pressure liquid motor a volume of liquid proportional to the main flow and utilizing this action to effect the proportional addition of the reagent.

The invention also includes a method of adding proportional amounts of a solid liquid or a gas to a liquid which comprises utilizing the differential head set up by the main flow of liquid to be treated to control the leakage of a pressure liquid in proportion to the main flow and utilizing the leakage liquid to operate a hydraulic motor which effects the proportional measurement of the reagent to be added to the main flow.

The invention also relates to apparatus for carrying out the herein described methods and details and arrangements in connection therewith hereinafter described or indicated.

The accompanying drawings illustrate more or less diagrammatically several modes of carrying out the invention:—

Figure 1:
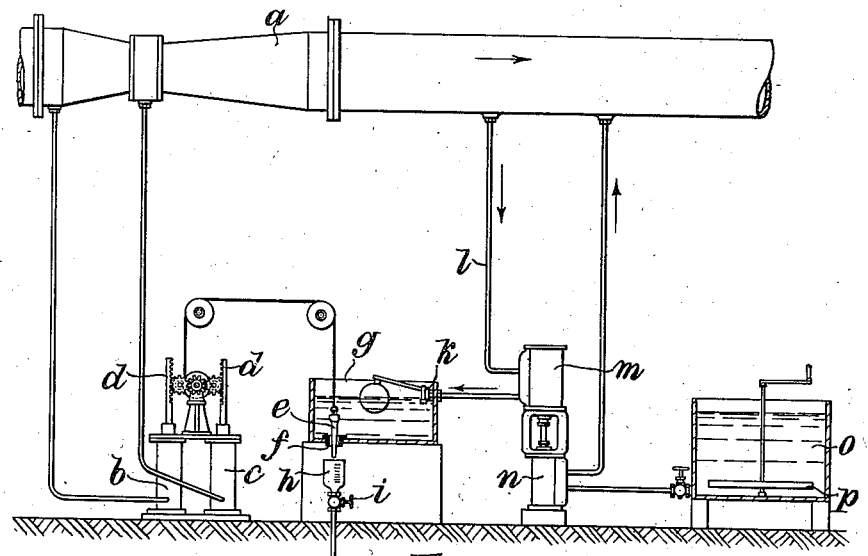
Figure 2:
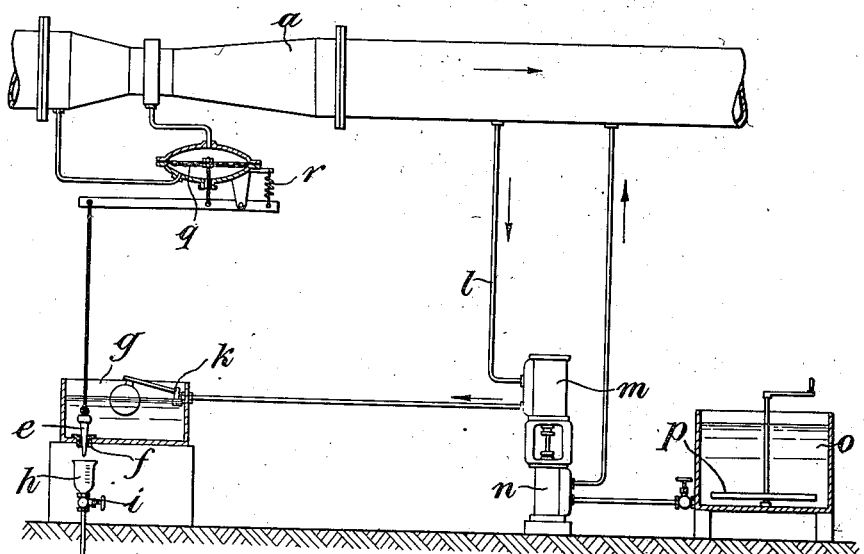
Figure 3:
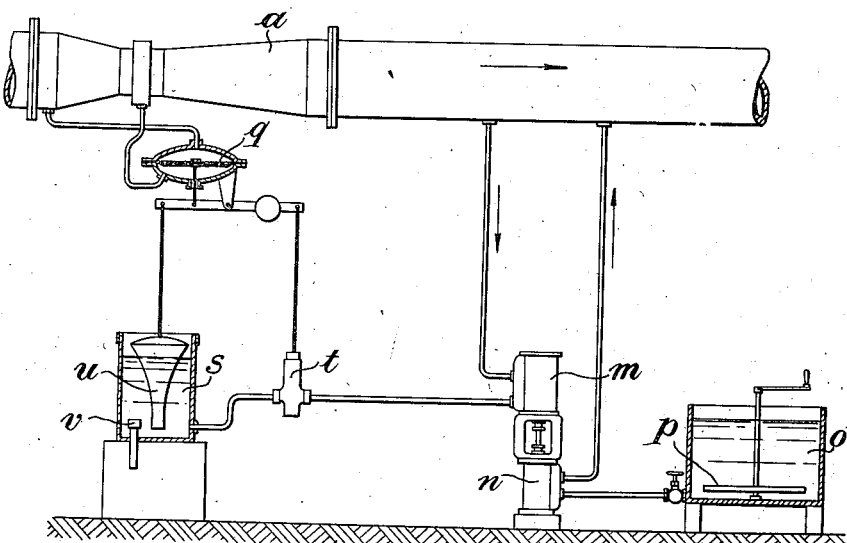

Figure 1 is an elevation of one form of apparatus for carrying out the invention and Figures 2 and 3 are similar views illustrating two modified forms of apparatus.

In carrying my invention into effect in one convenient manner when, for example, adding a liquid reagent to a flowing body of water I insert an orifice plate or Venturi tube in the main flow of the water to be treated and I utilize the differential head set up to regulate the discharge from a constant head tank which is fed through a ball valve from a pressure source of supply in which there is inserted a water motor preferably of the reciprocating type operating means for measuring the reagent or reagents to be added. It may, for example, operate a feed pump for injecting the reagent or reagents into the main flow or drive a dry powder feeding mechanism.

In one particular construction as illustrated in Figure 1 I connect the two sides of the orifice plate or the up-stream and throat of the venturi $a$ to a closed differential system involving chambers $b$ $c$ containing floats which through the medium of racks $d$ and pinions or otherwise actuate a tapered valve $e$ or other means serving to regulate a leakage outlet $f$ from a constant head tank $g$ so that the amount of liquid bled from the tank will be in direct proportion to the main flow of water to be treated. If desired I may provide a graduated measuring vessel $h$ by which the rate of discharge may be checked by noting the rise of liquid on closing the valve $i$.

As the discharge from the constant head tank is thus controlled in proportion to the main flow and corresponds exactly with that passed through the ball valve $k$ controlling the inlet to the tank $g$ and which may, for example, draw its pressure supply from the main flow through the pipe $l$ or from any other pressure source, then clearly any efficient water motor $m$ inserted in this supply pipe and coupled to an injection pump $n$ will ensure that the volume of reagent drawn from the tank $o$ (which may be fitted with a stirrer $p$) and injected into the main flow by the pump is proportional to the volume of water passing through the main. In this way not only do I ensure strict proportionality but I avoid throwing any load on to the metering device with the consequent inaccuracies that would be involved by any such loading.

Moreover, the accuracy of the addition is not in any way impaired due to irregularities which may arise from the varying resistance offered to the mechanical parts of the installation effecting the injection of reagent.

Figure 2 shows a similar arrangement to the foregoing in which the taper valve $e$ is controlled by a diaphragm $q$ under the influence of the differential head, the movement of the diaphragm being restricted by the control spring $r$.

It is clear that many modifications may be introduced in respect of various details of the installation as, for example, the supply of pressure motive fluid may be an independent supply instead of being drawn from the liquid to be treated, while devices other than the differential gear and constant head tank might be employed with equal advantage. For example, the differential pressure may act on a loaded diaphragm which controls the operating pressure fluid so that the rate of draw-off is such that through suitable means it balances the effect of the differential head on the diaphragm exactly at the point at which the rate of escape or leak-away of the pressure fluid is proportional to the main flow.

Figure 3 shows a form of apparatus in which the differential pressure acting on the diaphragm $q$ is balanced by the upward thrust in a float chamber $s$ to which liquid (from some pressure source) is admitted by the valve $t$ at such a rate that the upward thrust on the contoured float $u$ balances the effect of the differential pressure acting on the diaphragm. The float is so contoured that balance is maintained when the liquid in the chamber $s$ has risen to such a height that the discharge through the outflow $v$ and therefore the quantity passing through the motor $m$ is proportional to the main flow.

I claim:

1. Apparatus for effecting the proportional addition of a reagent to a flowing liquid, comprising a main conduit through which said liquid flows, a pressure operated hydraulic motor, conduits joined to said motor for delivering liquid under pressure thereto and liquid therefrom, means controlled by the rate of flow through said first mentioned conduit for controlling the rate of flow through said conduits connected to said motor in proportion to the rate of flow through said main conduit a feeding device operated by said motor for delivering reagent to the liquid flowing through said main conduit and means for determining at any time the rate of reagent feed to the main body of liquid, that comprises a device for measuring the discharge through the hydraulic motor.

2. Apparatus for effecting the proportional addition of a reagent to a flowing liquid, comprising a main conduit through which said liquid flows, means for setting up a differential head due to the flow of liquid through said conduit, a pressure operated hydraulic motor, a conduit leading to said motor and carrying liquid under pressure thereto and liquid therefrom, means controlled by said differential head for controlling the speed of operation of said motor by controlling the rate of continuous flow through said conduit leading to said motor and measuring means operated by said motor and adapted to take reagent from a supply thereof and deliver the same to said liquid flowing through the main conduit.

3. Apparatus for effecting the proportional addition of a reagent to a flowing liquid comprising a conduit for the flowing liquid, means for setting up a differential pressure due to the flow in said conduit, a constant head tank, a valve controlled by said differential pressure and regulating a continuous leakage from said constant head tank, a hydraulic motor operated by the supply of liquid to said tank and a pump operated by said motor for delivering the reagent to the flowing liquid.

4. A method of adding proportional amounts of a reagent to a liquid which comprises passing a main flow of liquid through a conduit deriving a differential head from said main flow of the liquid, continually bleeding liquid under pressure from said main flow, controlling the bleeding by said differential head, operating a hydraulic motor by the bled liquid and utilizing the power generated therein to effect the proportional measurement and delivery of the reagent to the main flow by said motor.

5. In an apparatus according to claim 1, means for deriving a differential pressure from the flowing liquid and means controlled by a derived differential pressure for controlling the discharge of pressure liquid through the motor.

6. Apparatus for effecting the proportionate addition of a reagent to a flowing liquid comprising, a main conduit through which said liquid flows, reagent feeding means and a hydraulic motor for actuating said feeding means, said motor being actuated by a continuous leakage of liquid therethrough; and a device for deriving a differential pressure from the flowing liquid, a constant head tank receiving the discharge from the motor, a valve governing discharge from said tank and a differential gear joined to said differential pressure deriving device and to said valve to position the latter according to the former to control the leakage of liquid through said motor in proportion to the volume of liquid flowing through said conduit.

WILLIAM PATERSON.